United States Patent [19]

Sasaki et al.

[11] Patent Number: 6,080,230

[45] Date of Patent: Jun. 27, 2000

[54] FRICTION MATERIAL COMPOSITION

[75] Inventors: Yosuke Sasaki; Michinori Yanagi, both of Saitama; Yuzo Todani, Gunma; Tadahiro Mita, Saitama, all of Japan

[73] Assignee: Akebono Brake Industry Co., Ltd., Tokyo, Japan

[21] Appl. No.: 09/191,344

[22] Filed: Nov. 13, 1998

[30] Foreign Application Priority Data

Nov. 14, 1997 [JP] Japan .................................... 9-313523

[51] Int. Cl.⁷ ...................................................... C09K 3/14
[52] U.S. Cl. ............................ 106/36; 523/149; 523/150; 523/152; 523/153; 523/155; 523/156; 523/157; 523/158
[58] Field of Search ............................... 106/36; 523/149, 523/150, 152, 153, 155, 156, 157, 158

[56] References Cited

U.S. PATENT DOCUMENTS

| | | | |
|---|---|---|---|
| 4,130,537 | 12/1978 | Bohrer | 106/36 |
| 4,918,116 | 4/1990 | Gardziella et al. | 523/153 |
| 5,013,328 | 5/1991 | Annen et al. | 8/442 |

FOREIGN PATENT DOCUMENTS

| | | |
|---|---|---|
| 0 074 551 | 8/1982 | European Pat. Off. . |
| 0 129 022 | 4/1984 | European Pat. Off. . |
| 0409 495 A1 | 7/1990 | European Pat. Off. . |
| 0640 774 A1 | 7/1994 | European Pat. Off. . |
| 0645 552 A1 | 8/1994 | European Pat. Off. . |
| 358077937 | 5/1983 | Japan . |
| 358077938 | 5/1983 | Japan . |
| 358077939 | 5/1983 | Japan . |
| 401074232 | 3/1989 | Japan . |
| 401250629 | 10/1989 | Japan . |

OTHER PUBLICATIONS

French Search Report by Examiner A. Boulon on Mar. 30, 1999.

*Primary Examiner*—Anthony Green
*Attorney, Agent, or Firm*—Finnegan, Henderson, Farabow, Garrett & Dunner, L.L.P.

[57] ABSTRACT

In a friction material composition containing a fiber base, and a binder, a novolak type phenolic resin having a mean molecular weight of from 3500 to 5000 is used as the binder.

4 Claims, No Drawings

FRICTION MATERIAL COMPOSITION

BACKGROUND OF THE INVENTION

1. Field of the Invention

The present invention relates to a friction material composition to be molded into a frictional material. Particularly it relate to a friction material composition in which not only the heat-forming time required for molding the composition into a friction material is short but also the performance of the friction material obtained is sufficiently satisfactory.

2. Description of the Related Art

A friction material containing asbestos as a base is conventionally used as a friction material applied to disc brake pads (which may be hereinafter called merely "pads"), brake linings, etc. for vehicles such as cars, railraod vehicles, etc. The bad influence of asbestos on health, however, has become an issue for about ten years. From this point of view, a non-asbestos friction material, or the like, has been developed as a friction material using no asbestos. The non-asbestos friction material takes the main current in the world and is diversified in kind.

Generally, the aforementioned friction material is produced by molding of a composite material (hereinafter referred to as "friction material composition") comprising: an asbestos base or inorganic fiber, organic fiber, metal fiber or a combination thereof used as a base; a friction modifier, an inorganic or organic filler, etc. added to the base as occasion demands; and a thermosetting resin, etc. added thereto as a binder for binding all materials as a whole. In the friction material composition for producing the friction material, a novolak type phenolic resin is generally used as the thermosetting resin used as a binder from the viewpoint of overall characteristics such as moldability, economy, heat resistance, etc.

Incidentally, the heat-forming time in the production of the friction material depends on the hardening reaction speed of the thermosetting resin used as a binder. In any one of known friction material compositions each using a novolak type phenolic resin as the thermosetting resin, however, there is a problem that expected good quality is hardly secured because the hardening state of the friction material obtained is apt to be insufficient if the hardening reaction time, that is, the heat-forming time is not sufficiently long. Therefore, a friction material composition using a novolak type phenolic resin, in which not only the performance of the resulting friction material obtained by use of the composition is sufficiently satisfactory but also the time required for hardening the binder, that is, the heat-forming time is short, needs to be developed for the purpose of reducing the cost in production of the friction material.

SUMMARY OF THE INVENTION

The present invention is designed from the aforementioned point of view and an object thereof is to provide a friction material composition in which the heat-forming time required for molding the composition into a friction material is short while the performance of the friction material obtained is secured sufficiently.

The inventor has earnestly continued the study to solve the aforementioned problem. As a result, it has been found that, when a novolak type phenolic resin having a higher molecular weight than that of conventional one is mixed as a binder in a friction material composition, not only the performance of the friction material obtained by use of the composition is kept sufficiently satisfactory but also the heat-forming time of the friction material can be shortened greatly because of the speedily hardening characteristic of the binder compared with a conventional friction material composition using a novolak type phenolic resin having a mean molecular weight of from about 2000 to about 2500. Thus, the present invention has been completed by a friction material composition containing a fiber base, and a binder, said friction material composition characterized in that a novolak type phenolic type having a mean molecular weight of from 3500 to 5000 is used as said binder.

Because the friction material composition according to the present invention contains a novolak type phenolic resin with a mean molecular weight of from 3500 to 5000 as a binder, the hardening speed of the friction material obtained by use of the composition can become high while the physical properties, such as hardness, or the like, of the friction material is kept moderate without irregularity in the size and hardening state of the friction material. Accordingly, the heat-forming time of the friction material can be shortened to attain the enhancement of efficiency in the production of the friction material.

DETAILED DESCRIPTION OF THE PREFERRED EMBODIMENTS

The present invention will be described below in detail.

The binder contained in the friction material composition according to the present invention will be first described before the friction material composition according to the present invention will be described.

(1) Binder Contained in Friction Material Composition According to the Invention In the friction material composition according to the present invention, a novolak type phenolic resin having a mean molecular weight of from 3500 to 5000 is used as binder.

As the novolak type phenolic resin used in the present invention, any material can be used without special limitation if the material is a novolak type phenolic resin having a mean molecular weight of from 3500 to 5000. With respect to the classification of the novolak type phenolic resin, not only a straight type novolak type phenolic resin but also a novolak type phenolic resin subjected to any one of various modifying processes such as rubber modification, cashew modification, epoxy modification, etc. can be taken as an example.

The range of the mean molecular weight of the novolak type phenolic resin used in the present invention is from 3500 to 5000 and the preferred range of the mean molecular weight is from 3500 to 4500. If the mean molecular weight of the novolak type phenolic resin is lower than 3500, the heat-forming time of the friction material cannot be shortened sufficiently. If a novolak type phenolic resin having a mean molecular weight higher than 5000 is used, cracking may occur in the resulting friction material to thereby bring the lowering of the physical properties.

The novolak type phenolic resin used in the present invention can be produced by a known method, for example, a method of reacting phenolS such as phenol, cresol, xylenol, alkylphenol, etc. and a kind of aldehyde such as formaldehyde, etc. under an acid catalyst such as zinc chloride, zinc acetate, etc.

The friction material composition according to the present invention contains not only the novolak type phenolic resin serving as a binder but also a hardener for hardening the resin. Specifically, hexamethylenetetramine is an example of the hardener. When the friction material composition according to the present invention contains hexamethylenetetramine as the hardener for hardening the novolak type phenolic resin, the hexamethylenetetramine content of the composition is generally from 8 to 11% by weight with respect to the weight of the novolak type phenolic resin.

When, for example, hexamethylenetetramine as the hardener is added and mixed into the novolak type phenolic resin and then heated to the hardening temperature, hexamethylenetetramine reacts with water to produce formaldehyde and ammonia. Under the pressure of ammonia and excessive formaldehyde thus produced, the novolak type phenolic resin is highly cross-linked and hardened. In the friction material composition according to the present invention, the aforementioned reaction is utilized to mold the friction material composition into a friction material.

The binder used in the friction material composition according to the present invention may be constituted by the novolak type phenolic resin singly or the binder may be constituted by a combination of the novolak type phenolic resin and a thermosetting resin as another component. Further, when the novolak type phenolic resin and the thermosetting resin as another component as used in combination in the present invention, a hardener, a hardening accelerator, etc. for hardening the thermosetting resin may be added to the friction material composition according to the present invention.

Specific examples of the thermosetting resin arbitrarily mixed in the binder used in the present invention are polyamide, polyimide, bismaleimide-triazine resin (BT resin), polyether-ether-ketone (PEEK), resol type phenolic resin, etc.

(2) Friction Material Composition According to the Invention

The friction material composition according to the present invention is a friction material composition containing a fiber base and a binder and is characterized in that a binder explained above in the paragraph (1) is used as the binder.

The binder content of the friction material composition according to the present invention is substantially equal to the binder content of a general friction material composition. Specifically, the binder content is selected to be in a range of from about 15% by volume to about 25% by volume with respect to the whole volume of the composition.

Specific examples of the fiber base used in the friction material composition according to the present invention include: inorganic fibers such as asbestos, ceramic fiber, glass fiber, etc.; organic fibers such as aramid fiber, acrylic fiber, cellulose fiber, etc.; metal fibers of iron, copper, brass, aluminum, etc.; and combinations of these fibers. These fiber base materials used in the present invention can be provided to have the same characteristic as fiber base materials generally used in the friction material composition.

In the friction material composition according to the present invention, any other components such as a friction modifier, a filler, etc. generally used in the friction material composition than the friction base and binder can be added without spoiling the effect of the present invention.

Specifically, with respect to the friction modifier, aluminum oxide, zirconium oxide, chrome oxide, zircon, mullite, or the like, can be used as abrasives for increasing the friction coefficient and graphite, molybdenum disulfide, or the like, can be used as lubricants for reducing the wear rate.

Specific examples of the filler include: inorganic fillers such as barium sulfate, calcium carbonate, potassium titanate, etc. for improving mechanical strength; and organic fillers such as cashew dust, rubber powder, etc. for improving brake noise.

The proportion of the aforementioned arbitrary components contained in the friction material composition can be selected to be substantially equal to the proportion of the components contained in the general friction material composition.

The fiber base and binder and any other components to be added thereto are stirred and mixed by a known method, so that the friction material composition according to the present invention can be obtained.

As a method of molding a friction material by use of the friction material composition according to the present invention, there can be employed a method which is substantially the same as the method of molding a friction material by use of a general friction material composition.

Specifically, various kinds of material components are mixed. A friction material composition obtained by stirring and mixing the material components is thermally molded under the suitable pressure and temperature condition and then heated under the suitable temperature condition. When the friction material composition according to the present invention is used, however, the time required for thermal molding can be shortened greatly compared with the case where a friction material is produced by use of a conventional friction material composition using a novolak type phenolic resin.

The production condition for molding a friction material by use of the friction material composition according to the present invention will be described below specifically. For example, the condition of heat-forming using molds, etc. is selected in accordance with the proportion of components contained in the friction material composition and the size and shape of the friction material. Generally, the condition of a temperature of from 150 to 200° C., a surface pressure of from 300 to 600 kg/cm$^2$ and a treating time of from about 3 to about 4 minutes can be employed. Also the condition for heating after heat-forming is selected suitably in accordance with the proportion of components contained in the friction material composition and the size and shape of the friction material. Generally, the condition of a temperature of from 200 to 300° C. and a treating time of from about 1 to about 5 hours can be employed.

Further, as occasion demands, the friction material composition may be preparatorily molded into the form of grains, or the like, before the heat-forming or finishing such as shape-treating, or the like, may be performed after the heating.

The purposes for which the friction material obtained by molding the friction material composition according to the present invention is utilized are not limited specially if the friction material can be used as a friction material. Specifically, the friction material is used in pads, linings, facings, brake blocks, etc. for cars, industrial vehicles, railroad vehicles, etc.

Examples of the present invention will be described below.

Materials of compositions shown in the following Table 1 were stirred and mixed thus to obtain friction material compositions in Examples 1 to 3 and Comparative Examples 1 to 3 respectively.

Then, the time required for thermally molding each of the friction material compositions obtained as described above under pressure and heat was measured by the following method. Further, the Rockwell hardness of each of moldings obtained in this occasion was measured by a Rockwell hardness gage. Results are shown in Table 2. The novolak type phenolic resins in Table were obtained by reaction of a phenol and a formaldehyde.

The heat-forming time was measured so that the percentage of failures caused by the occurrence of cracking in the resulting molding was not larger than 0.3% when each of the friction material compositions obtained as described above was thermally molded under the condition of a temperature shown in Table 2 and a pressure of 500 kg/cm$^2$ by use of molds.

TABLE 1

| Material | Proportion (Vol. %) |
| --- | --- |
| Novolak type phenolic resin (including hexamethylenetetramine) having a mean molecular weight shown in the following Table 2 | 20 |
| Graphite | 10 |
| Rubber powder | 7 |
| Cashew dust | 13 |
| Barium sulfate | 10 |
| Mica | 4 |
| Iron oxide | 4 |
| Potassium titanate | 14 |
| Copper fiber | 3 |
| Aramid pulp | 6 |
| Ceramic fiber | 4 |
| Magnesium oxide | 3 |
| Zirconium Oxide | 2 |

TABLE 2

| | Novolak type phenolic resin mean molecular weight | Hexa-methylene-Tetra-mine (wt %)*1 | Heat-forming temperature (° C.) | Heat-forming Time (Hrs)*3 | Rockwell Hardness (HRS) |
| --- | --- | --- | --- | --- | --- |
| Example 1 | 3500 | 9.0 | 170 | 4.0 | 80 |
| Example 2 | 4000 | 9.0 | 175 | 3.5 | 80 |
| Example 3 | 4500 | 9.0 | 180 | 3.0 | 75 |
| Comparative Example 1 | 2000 | 9.0 | 150 | 10.0 | 85 |
| Comparative Example 2 | 2500 | 9.0 | 150 | 9.0 | 80 |
| Comparative Example 3 | 5500 | 9.0 | 180 | 3.0 | 55*2 |

TABLE 2-continued

| Novolak type phenolic resin mean molecular weight | Hexa-methylene-Tetra-mine (wt %)*1 | Heat-forming temperature (° C.) | Heat-forming Time (Hrs)*3 | Rockwell Hardness (HRS) |
| --- | --- | --- | --- | --- |

*1% by weight with respect to the weight of the novolak type phenolic resin
*2Cracking occurred.
*3The heat-forming time was measured so that the percentage of failures caused by the occurrence of cracking in the resulting molding was not longer than 0.3%.

It is apparent from the results shown in Table 2 that the friction material composition according to the present invention is designed so that the time required for heat-forming is short while the hardness of the resulting molding is kept moderate, whereas the friction material composition according to each comparative example, containing a novolak type phenolic resin having a mean molecular weight being out of the scope of the present invention is designed so that a long time is required for heat-forming or the hardness of the resulting molding is not moderate.

In the friction material composition according to the present invention, not only the heat-forming time required for molding the friction material composition into a friction material is short but also the performance of the friction material obtained by use of the friction material composition is sufficiently satisfactory. Accordingly, when the friction material composition according to the present invention is sued, enhancement of efficiency in production of the friction material can be attained.

What is claimed is:

1. A friction material composition comprising:
   a fiber base; and
   a novolak phenolic resin as a binder, having a mean molecular weight of from 3500 to 5000.

2. A friction material composition according to claim 1, wherein the mean molecular weight of said novolak phenolic resin is from 3500 to 4500.

3. A friction material composition according to claim 1, wherein said novolak phenolic resin comprises diphenylmethane polymer phenolic resin.

4. A friction material composition according to claim 1, further comprising a hexamethylenetetraamine as a hardener.

* * * * *